United States Patent [19]
Mills et al.

[11] 3,891,694
[45] June 24, 1975

[54] PLASTICIZER PURIFICATION

[75] Inventors: Robert H. Mills, St. Louis; Richard R. Raube, Ballwin, both of Mo.

[73] Assignee: Monsanto Company, St. Louis, Mo.

[22] Filed: May 18, 1970

[21] Appl. No.: 38,499

[52] U.S. Cl....... 260/475 B; 260/479 S; 260/485 L; 260/485 S
[51] Int. Cl... C07c 69/44; C07c 69/60; C07c 69/80
[58] Field of Search.. 260/485 S L, 475 B, 475 P R, 260/479 S

[56] References Cited
UNITED STATES PATENTS
2,778,849   1/1957   Ackelsbery...................... 260/475 B

*Primary Examiner*—Lorraine A. Weinberger
*Assistant Examiner*—E. Jane Skelly
*Attorney, Agent, or Firm*—R. E. Wexler

[57] ABSTRACT

Carboxylic acid ester plasticizers are purified and decolorized by a process which comprises concurrently subjecting the plasticizer to vacuum steaming and treatment with a peracid at a temperature above about 120°C. The plasticizers subjected to purification by the process of this invention are generally useful in the production of resinous or rubbery compositions.

9 Claims, No Drawings

PLASTICIZER PURIFICATION

BACKGROUND OF THE INVENTION

This invention relates to purification and decolorization of plasticizers and is particularly concerned with the decolorization of organic carboxylic ester plasticizers.

Esters of organic acids, such as phthalic acid, maleic acid and adipic acid, are widely employed as plasticizers for synthetic resins, such as polyvinyl chloride. Although these plasticizers are satisfactory in most applications, the production thereof has often been accompanied by the formation of certain impurities and color bodies which, although not detrimental insofar as the functioning of the plasticizer is concerned, are nevertheless undesirable from a commercial aspect. For example, the formation of color bodies in a plasticizer prohibits the use of that plasticizer in the production of light colored products.

The nature of the color bodies formed in plasticizers has never been defined. It is possible that the color may be due to traces of dissolved ionic bodies which are carried over during distillation, or the color may be due to partial decomposition of the plasticizer during distillation or to the presence of conjugated materials.

A number of methods have been used in the past to purify and decolorize organic carboxylic acid ester plasticizers. Thus, such conventional means as steam stripping, filtration, charcoal adsorption, solvent extraction, oxidation and the like have been used with varying degrees of success.

The customary standard used to indicate the quantity or intensity of color contained in liquids, including plasticizers, is known as the A.P.H.A. Standard Color Test. This test is one developed by the American Public Health Association which is known as the Hazen Platinum-Cobalt Scale, a description of which is found on page 2048 of the fifth edition of "Standard Methods of Chemical Analysis" by W. Scott.

In spite of the attempts in past years to purify and decolorize organic acid ester plasticizers, the problem still remains.

SUMMARY OF THE INVENTION

In accordance with the present invention there is provided an improvement in the purification and decolorization of organic acid ester plasticizers whereby the normal vacuum steaming of such plasticizers to remove volatile impurities is concurrently associated with the treatment of the plasticizer ester with a peracid at a temperature substantially higher than is ordinarily used in peracid decolorization procedures.

The benefits from the method of this invention are (1) the virtual elimination of the immediate odor caused by ordinary treatments, (2) virtual elimination of by-product peroxides which cause odor during storage, (3) the reduction of the amount of peracid necessary for a given level of decolorization, (4) the elimination of safety hazards associated with the addition of peracids to an open reactor containing air and alcohol vapors and (5) the elimination of one to three washing steps usually necessary with conventional peracid treatment.

DESCRIPTION OF THE PREFERRED EMBODIMENT

In accordance with the purification treatment process of the present invention, certain organic ester plasticizers are exposed to two methods known in the art for the purification of organic ester plasticizers. One of the methods is vacuum steaming to remove volatile impurities and the other method is peracid treatment for decolorization. The point of departure from the prior art is that the present process obtains outstanding results by simultaneously exposing the organic plasticizers to both procedures (i.e. vacuum steaming and peracid decolorization) at a temperature which is substantially higher than that ordinarily used for peracid decolorization.

It has been surprisingly found that the simultaneous treatment of organic ester plasticizers by vacuum steaming and peracid decolorization give outstanding results with virtual elimination of impurity problems in plasticizers and shows particularly outstanding improvement in the purification of the alkyl, aryl and mixed alkyl-aryl esters of phthalic acid, maleic acid, fumaric acid, trimellitic acid and adipic acid.

Among others, esters which are amenable to treatment by the process of the present invention include diphenyl adipate, dicyclohexyl adipate, butyl benzyl adipate, diethyl adipate, dibutyl adipate, diisobutyl adipate, di(1,3-dimethylbutyl)adipate, dicapryl adipate, dioctyl adipate, diisooctyl adipate, n-octyl-n-decyl adipate, dinonyl adipate, didecyl adipate, diisodecyl adipate, didodecyl adipate, dibutyl phthalate, diethyl phthalate, dioctyl phthalate, di-2-ethylhexyl phthalate, diphenyl phthalate, dicyclohexyl phthalate, butyl benzyl phthalate and the corresponding fumarate, trimellitate, maleate and similar esters.

The peracids utilized in accordance with the present invention may be aliphatic or aromatic in character and if aliphatic they may be cyclic or non-cyclic, saturated or unsaturated. The acids also may be monobasic or polybasic. Illustrative peracids utilized include peracetic, percrotonic, peracrylic, permethacrylic, permaleic, perfumaric, perpropionic, perbutyric, perisobutyric, perfuroic, perbenzoic and the like. The preferred acid for use in accordance with the present invention is peracetic acid. The concentration of the peracid used in the process may range from about 0.005 percent to about 0.5 percent based on the weight of the organic ester. Preferably, the acid is present in a concentration of from about 0.01 percent to about 0.3 percent, with a particularly beneficial concentration range being from about 0.02 percent to about 0.27 percent.

The temperature at which the purification process of this invention is conducted is critical. Accordingly, the temperature should be from at least about 120°C. up to about 220°C. or higher.

The high temperatures used in the present process are surprising since peracid decolorization procedures are normally conducted at temperatures below about 110°–120°C. due to the inherent instability of peracids. For example, it was previously believed peracetic acid explodes violently at temperatures of about 110°C. It is theorized that the high temperature of the present process is permissible primarily because of the low concentrations of peracid used and the normally, but not necessarily, subatmospheric pressures utilized. It is believed that it is the decomposition of the peracid at the high temperatures used in the present process which contributes to the outstanding and unexpected results attained.

The pressure utilized during the purification process is atmospheric pressure or lower, down to a range of approximately 50 torr (mm. Hg., absolute). The pressure is dictated by the nature of the volatile materials to be removed. Pressures below about 50 torr remove peracetic acid before it can react completely, and consequently reduce its decolorizing ability.

Typically, the process of this invention involves the customary base and water washes used to remove partial esters. After removal of partial esters, the ester is heated to at least 120°C. while reducing the pressure to 100–200 torr. An amount of 0.1 percent, based on the weight of the ester, of a 50 percent solution of NaOH in water is added to the ester either before or during the heatup. When the batch reaches the desired temperature, steam is turned on and peracid is added subsurface to the ester over a period of 15–30 minutes.

Following peracid addition, steaming is continued for approximately one hour, or longer if necessary, to completely remove volatile material.

The ester is then cooled to about 100°C. or less before breaking vacuum to ensure odor is not formed by contact with air while hot.

The ester is then filtered to remove solids.

The following examples will serve to illustrate certain specific embodiments within the scope of this invention and are not to be construed as limiting the scope thereof.

EXAMPLE 1

This example illustrates the results obtained by the use of conventional vacuum steaming.

Crude dioctyl adipate (250 APHA color) is washed with a base wash and a water wash to remove partial esters. The remaining ester is placed in a standard 1 liter glass reaction flask equipped with an agitator, a subsurface inlet and a take-off condenser.

The ester is heated to 145°–150°C. and the pressure is reduced to 85 torr. Steam is introduced subsurface for 56 minutes. The ester is then cooled to 115°C. before the steam is shut off. The ester is dried 10 minutes at 110°–115°C., the vacuum is broken and the ester is filtered. Its color is 175 APHA.

EXAMPLE 2

This example illustrates the effect of treating an ester with peracetic acid but without steaming.

To the crude ester of Example 1 is added sufficient 50 percent aqueous sodium hydroxide to neutralize the partial esters (about 1.5 percent by weight of ester). The salts are not separated. Peracetic acid (0.4 percent by weight of ester, of 40 percent solution) is added all at once and the mixture is stirred at 110°–115°C. for 30 minutes. Two water washes at 85°C. give a final ester, after dehydration and filtration, with a color of 75 APHA.

EXAMPLE 3

This example illustrates the results obtained by treating organic ester plasticizers with peracetic acid subsequent to steaming.

The steamed ester of Example 1 (before filtration) is held at 110°–115°C. Sodium carbonate (0.15 percent based on ester) is added to the stirred ester, and then 0.10 percent peracetic acid (40 percent, in acetic acid) is added all at once. The mixture is stirred for 30 minutes at 110°–115°C.

The temperature is then lowered to 85°–90°C. and the ester is washed with two-thirds its volume of water for 15 minutes. The ester is separated and dried 10 minutes at 100°–105°C. and 50 torr. When filtered, its color is 20 APHA. Its odor is pronounced and acrid.

EXAMPLE 4

This example illustrates the results obtained by treating organic ester plasticizers with peracetic acid at lower levels, subsequent to steaming.

The steamed ester of Example 1 (before filtration) is treated as in Example 2, but the amounts of reagents are reduced to 0.05 percent sodium carbonate and 0.02 percent peracetic acid.

After filtration, the ester color is 100 APHA.

EXAMPLE 5

This example illustrates the process of this invention, whereby steam and peracid treatments are concurrently used at high temperature, for treating organic ester plasticizers.

The crude dioctyl adipate used in Example 1 is washed to remove partial esters.

A small amount (0.1 percent based on ester) of 50 percent aqueous sodium hydroxide is added to the ester, and the mixture is heated to 134°C. at 100 torr. Steam is turned on and peracetic acid (0.022 percent based on ester) is added subsurface over 35 minutes. The temperature is then raised to 150°–153°C. and the steaming is continued for two hours.

The temperature is reduced to 110°C., steam is shut off, the ester is dried for 10 minutes, vacuum is broken, and the ester is filtered. Its color is 17½ APHA, and its odor is very faint.

Substitution of maleate, fumarate, phthalate, trimellitate and similar esters for the adipate ester, and other peracids for peracetic acid in Examples 1 through 5 afford similar results.

The above examples illustrate the unexpected and outstanding results obtained in the purification of organic ester plasticizers when simultaneously treated by steam and peracid treatment within a temperature range of from about 120° to about 220°C. or higher.

While the invention has been described hereinabove with regard to certain illustrative specific embodiments, it is not so limited, since many modifications and variations are possible in the light of the above teachings. It is understood therefore that the invention may be practiced otherwise than as specifically described without departing from the spirit and scope of the invention.

We claim:

1. In a method for purifying a plasticizer for synthetic resins which is an alkyl, aryl or mixed alkyl-aryl ester of an organic acid the improvement which comprises simultaneously treating said ester with steam and an aliphatic or aromatic peracid at a temperature of at least about 120°C.

2. The method of claim 1 wherein said acid is phthalic acid.

3. The method of claim 1 wherein said acid is maleic acid.

4. The method of claim 1 wherein said acid is fumaric acid.

5. The method of claim 1 wherein said acid is adipic acid.

6. The method of claim 1 wherein said acid is trimellitic acid.

7. The method of claim 1 wherein said peracid is peracetic acid.

8. The method of claim 7 wherein the concentration of said acid is from about 0.005 percent to about 0.5 percent, based on the weight of said ester.

9. The method of claim 7 wherein the concentration of said acid is from about 0.01 percent to about 0.3 percent.

* * * * *